United States Patent [19]
Kurematsu et al.

[11] Patent Number: 5,764,318
[45] Date of Patent: Jun. 9, 1998

[54] LIQUID CRYSTAL DISPLAY PANEL AND PROJECTOR UTILIZING THE SAME

[75] Inventors: Katsumi Kurematsu, Kawasaki; Hideaki Mitsutake, Tokyo, both of Japan

[73] Assignee: Canon Kabushiki Kaisha, Tokyo, Japan

[21] Appl. No.: 924,430

[22] Filed: Aug. 27, 1997

Related U.S. Application Data

[63] Continuation of Ser. No. 341,466, Nov. 17, 1994, abandoned, which is a continuation of Ser. No. 243,064, May 13, 1994, abandoned, which is a continuation of Ser. No. 950,928, Sep. 24, 1992, abandoned.

[30] Foreign Application Priority Data

| Sep. 26, 1991 | [JP] | Japan | 3-248056 |
| Jan. 16, 1992 | [JP] | Japan | 4-005790 |
| Jan. 24, 1992 | [JP] | Japan | 4-032815 |

[51] Int. Cl.⁶ .................. G02F 1/1335; G02F 1/1333
[52] U.S. Cl. .................. 349/5; 349/57; 349/95; 349/110; 349/122
[58] Field of Search .................. 359/40, 41, 74, 359/59, 67; 349/57, 95, 122, 5, 110

[56] References Cited

U.S. PATENT DOCUMENTS

| 4,790,632 | 12/1988 | Miyakawa et al. | 359/40 |
| 4,904,063 | 2/1990 | Okada et al. | 359/40 |
| 5,052,783 | 10/1991 | Hamada | 359/40 |
| 5,101,279 | 3/1992 | Kurematsu et al. | 359/40 |
| 5,161,042 | 11/1992 | Hamada | 359/40 |
| 5,165,075 | 11/1992 | Hiroki et al. | 359/54 |
| 5,680,186 | 10/1997 | Watanabe et al. | 349/122 |

FOREIGN PATENT DOCUMENTS

| 0 366 462 | 5/1990 | European Pat. Off. | |
| 0 404 289 | 12/1990 | European Pat. Off. | |
| 0 409 619 | 1/1991 | European Pat. Off. | |
| 0425251 | 5/1991 | European Pat. Off. | 359/40 |
| 57-157215 | 9/1982 | Japan . | |
| 60-059752 | 12/1985 | Japan . | |
| 60-262131 | 12/1985 | Japan . | |
| 1-222221 | 9/1989 | Japan | 359/40 |
| 2-0115889 | 4/1990 | Japan . | |
| 2-0257119 | 10/1990 | Japan . | |
| 2-302726 | 12/1990 | Japan . | |
| 3-0136004 | 6/1991 | Japan . | |
| 3-182719 | 8/1991 | Japan | 359/48 |
| 3-214121 | 9/1991 | Japan | 359/40 |

OTHER PUBLICATIONS

Patent Abstracts of Japan, vol. 15, No. 11, Jan. 10, 1991 (JP–A–22 57 119, Oct. 17, 1990).
Patent Abstracts of Japan vol. 7, No. 59, Mar. 11, 1983, (JP–A–57 203 569, Dec. 13, 1982).
Brandon, "Display Device", IBM Technical Disclosure Bulletin, vol. 19, No. 2 (Jul. 1976), p. 691.

Primary Examiner—Anita Pellman Gross
Attorney, Agent, or Firm—Morgan & Finnegan LLP

[57] ABSTRACT

This invention relates to a liquid crystal display panel which provided with a liquid crystal layer including plural pixels and a microlens array provided at the light incident side of the liquid crystal layer, wherein the distance between said microlenses and said liquid crystal layer is different comparing at a central position with at a peripheral portion of the liquid crystal display panel.

22 Claims, 13 Drawing Sheets

LIQUID CRYSTAL DISPLAY PANEL AND PROJECTOR UTILIZING THE SAME

This is a continuation of application Ser. No. 08/341,466, filed on Nov. 17, 1994, now abandoned, which is a continuation of application Ser. No. 08/243,064, filed on May 13, 1994 now abandoned, which is a continuation of application Ser. No. 07/950,928, filed on Sep. 24, 1992 now abandoned.

BACKGROUND OF THE INVENTION

1. Field of the Invention

The present invention relates to a liquid crystal display panel apparatus for use in a liquid crystal display, a liquid crystal projector and the like.

2. Related Background Art

Liquid crystal display panels which an improved practical aperture rate by the utilization of microlenses have already been disclosed for example in the Japanese Patent Laid-Open Application Nos. 57-157215, 60-262131, 2-115889, 2-257119 and 3-136004.

In the application of such a liquid crystal display panel to a liquid crystal projector, there is generally adopted an optical system as shown in FIG. 1, and a condenser lens 2 is usually provided behind the liquid crystal display panel 1 in order to concentrate the illuminating light into the projection lens. Consequently, as shown in FIG. 2, the illuminating light enters the liquid crystal display panel 1 obliquely in the peripheral portion thereof. For this reason, the pitch of the microlenses is gradually increased toward the peripheral portion of the panel 1, in such a manner that the optical axes of the incident light to all the microlenses pass through the apertures of the liquid crystal pixels.

FIGS. 3A and 3B are partial magnified cross-sectional views of said panel 1, respectively in the central portion and in the peripheral portion. In these drawings there are shown GI microlenses 8; a substrate 3c for microlenses; a liquid crystal layer 4; a TFT (thin film transistor) substrate 5; opaque areas 6; and apertures 7. Both in the central and peripheral portions, as indicated by arrows, the optical axis of the incident light to each microlens is provided to pass through the center of the aperture 7. In the peripheral portion, however, since the incident light is oblique against the panel as shown in FIG. 3B, the optical path from the microlens to the aperture becomes longer than that in the central portion. Consequently the focal point of the microlens becomes positioned in front of the aperture, so that the light beam again diverges in passing through the aperture and is partly intercepted by the opaque area. Consequently, even when the pitch of the microlenses is gradually increased toward the peripheral portion, as explained above, in order that all the optical axes of the incident light to the microlenses pass through the apertures of the liquid crystal pixels, the transmission efficiency is lower in the peripheral portion than in the central portion.

In order to avoid such drawback, the Japanese Patent Laid-Open Application No. 2-257119 proposed to gradually decrease the power of the microlenses from the central portion toward the peripheral portion, in such a manner that the focal point of the light beam passing through the microlens always positions at the center of the aperture area. However, such variation of the powers of microlenses within a panel requires corresponding alternation of the manufacturing conditions of the microlenses to need a very complicated manufacturing process.

Also the above-mentioned conventional configuration has been associated with the following drawbacks since the microlens array is formed on a glass substrate:

(1) Configuration provided with microlens array at outside:

In a conventional embodiment shown in FIG. 4, a liquid crystal layer 904 is sandwiched between a glass substrate 901 and a TFT substrate 903. On a surface of the TFT substrate 903, facing the liquid crystal layer 904, TFT's 907 (including wiring portions) and pixel electrodes 906 constituting effective pixel areas are alternately formed, and a counter electrode 905 is formed on a face of the glass substrate 901 facing the liquid crystal layer 904.

A microlens array 902, provided on the external surface of the glass substrate 901 is so formed as to have a focal length equal to the thickness d (usually 1.1 mm) of the glass plate 901, and as to condense the illuminating lights A, B to the area of the pixel electrode 906. In this manner, the transmittance of the liquid crystal display device can be improved.

However, the illuminating light may have a spreading angle θ against the optical axis thereof, and oblique incident rays $b_1$, $b_2$ aberrated from the principal ray B cannot reach the pixel electrode 906 constituting the effective pixel area, when the pixel size becomes smaller (particularly less than 100 μm). This phenomenon becomes more conspicuous as the pixel size becomes smaller in comparison with thickness d of the glass substrate 901, and the effect of microlenses 902 for improving the transmittance becomes accordingly reduced:

(2) Configuration with microlens array at the liquid crystal side:

In a conventional configuration shown in FIG. 5, a microlens array 902 is formed at the side of the liquid crystal layer 904.

As the thickness t of the liquid crystal layer 904 is usually as small as 7 to 10 μm, rays A, B illuminating the peripheral area of the pixel are scarcely condensed even with the microlens of a highest power obtainable with the current technology, and cannot hit the effective pixel area. Consequently the microlens array 902 cannot fully exhibit the effect of improving the transmittance.

FIG. 6 is a magnified plan view of an active matrix substrate for a liquid crystal display device, wherein a display pixel 603 and a switching TFT 604 are formed close to each crossing point of a row electrode 601 and a column electrode 602. On these elements there is provided with a polyimide alignment film, subjected to a rubbing process for aligning the liquid crystal. A cross section along a line I-II is shown in FIG. 7. On a gate electrode 701 of Al or Cr, there is provided with a gate insulation film 702. Across an amorphous Si layer (hereinafter written as a-Si layer) 703 and an a-Si(n+) layer 704, there are provided with drain electrode 705, a source electrode 706 and pixel electrodes 707 connected thereto. On these elements laminated are a protective insulation film 708 and a liquid crystal alignment film 709.

A liquid crystal display panel is formed by positioning the above-explained first alkaline glass substrate 101 and a second alkaline glass substrate bearing a counter electrode in mutually opposed relationship, and filling the gap therebetween with liquid crystal.

In such conventional configurations, however, the function of the TFT 604 formed on the alkaline glass substrate 101 is damaged if alkali ions intrude into said TFT from said alkaline glass substrate 101.

There is already known a configuration in which an alkali-free glass substrate, capable of intercepting the alkali ions, is provided between the glass substrate 101 and the TFT 604, but such configuration inevitably increases the thickness of the liquid crystal display panel. Also it is higher in cost, because the alkali-free glass is more expensive than the ordinary alkaline glass.

For solving such drawback problem, it is conceived to form an ion intercepting layer, for example by an evaporated film, on the glass substrate 101, but the liquid crystal alignment film 709 cannot be formed flat if the number of films between the liquid crystal alignment film 709 and the glass substrate 101 increases in the display pixel area 603 adjacent to the TFT 604. Therefore the function of the film 709 becomes degraded.

SUMMARY OF THE INVENTION

In consideration of the foregoing, an object of the present invention is to provide a liquid crystal display device capable of improving the optical transmittance.

Another object of the present invention is to provide a compact liquid crystal display panel, capable of preventing intrusion of alkali ions into the TFT without deteriorating the function of the liquid crystal alignment film.

In a first embodiment of the present invention, the microlenses are so provided that the principal rays of incident light to the microlenses pass through the centers of the apertures of the liquid crystal pixels, and the distance between the microlenses and the liquid crystal layer gradually decreases from the central portion of the liquid crystal display panel to the peripheral portion thereof.

In a second embodiment of the present invention, in a liquid crystal display device composed of a pair of substrates sandwiching a liquid crystal layer, a lens array corresponding to the pixel arrangement of said liquid crystal layer is formed inside a substrate at the light entrance side, at a position of a predetermined distance from said liquid crystal layer.

In this configuration, said lens array may be formed by an ion exchange method, and such lens array formed by the ion exchange method may assume the form of an array of cylindrical lenses or of a fly's eye lens.

Also said substrate at the light entrance side may be provided with a first transparent member having said lens array at the surface of said liquid crystal layer, and a second transparent member of a thickness substantially same as said predetermined distance, adhered to the surface of said first transparent member at the liquid crystal layer side, in such a manner as to sandwich said lens array by said first and second transparent members.

Said predetermined distance may be selected substantially equal to the focal length of said lens array, or may be selected as to satisfy a condition $2L \cdot \tan\theta \leq W$, wherein L is said predetermined distance, W is the pixel width of said liquid crystal layer, and $\theta$ is the spreading angle of the light entering said substrate at the light incident side.

Furthermore, another lens array may be provided on the surface of the substrate providing the lens array therein, and, in such case, said lens arrays may have mutually different powers.

Also lens arrays may be provided respectively within the paired substrates sandwiching the liquid crystal layer, in such a manner as to be symmetrical with respect to the liquid crystal layer.

Furthermore, a glass film or a polymer film may be adhered to the surface of the substrate providing with the lens array therein.

In a third embodiment of the present invention, in a liquid crystal display panel including first and second substrates; a liquid crystal layer sandwiched between said first and second substrates; a thin film transistor formed on said first substrate; wirings for actuating said thin film transistor; and an alignment film for aligning the liquid crystal molecules of said liquid crystal layer, wherein said first substrate is a glass substrate containing alkali ions, and an ion intercepting layer, for preventing the intrusion of the alkali ions from said first substrate to said thin film transistor, is so formed on said first substrate that the ion intercepting effect is higher in the position of said thin film transistor than in other positions.

DETAILED DESCRIPTION OF THE PREFERRED EMBODIMENTS

Figure 8:
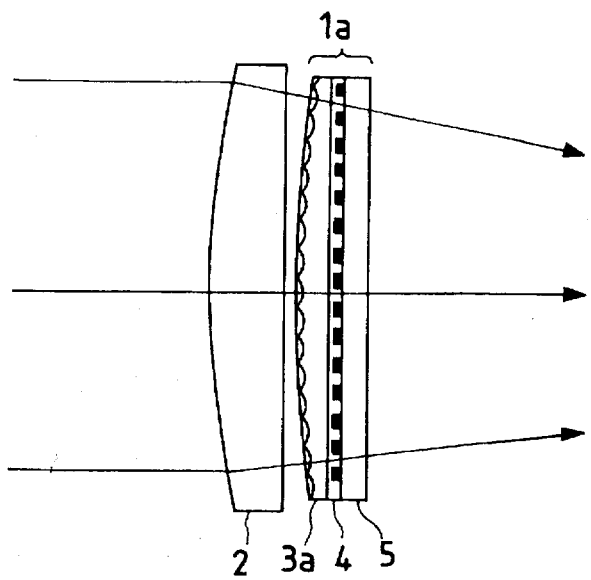
FIG. 8 is a cross-sectional view of a first embodiment of the liquid crystal display panel of the present invention.
Figure 9A:
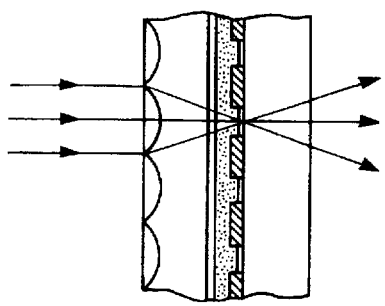
FIGS. 9A and 9B are partial magnified cross-sectional views of the first embodiment of the liquid crystal display panel of the present invention, respectively in a central portion and a peripheral portion thereof.
Figure 9B:
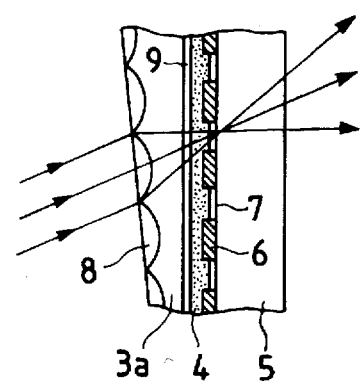

FIG. 8 shows the first embodiment of the present invention, wherein shown are a condenser lens 2; a liquid crystal display panel 1a; a microlens substrate 3a; a liquid crystal layer 4; and a TFT substrate 5. The microlens substrate 3a is formed gradually thinner from the central portion thereof toward the peripheral portion. FIGS. 9A and 9B are partial magnified cross-sectional views of the liquid crystal display panel 1a, respectively in a central portion and a peripheral portion thereof. Microlenses 8 are arranged, as in the aforementioned prior art configuration, in such a manner that the optical axes of incident light to the microlenses pass through the centers of the apertures 7.

Furthermore the thickness of the substrate 3a is regulated, toward the peripheral portion thereof, in such a manner that the distance between the microlens 8 and the aperture 7 is always constant along the optical axis of the light entering obliquely by the condenser lens 2. Consequently, even in the peripheral portion of the panel, as shown in FIG. 9B, the focal point of the light beam passing through the microlens is positioned always at the center of the aperture, so that a satisfactory transmittance can be obtained as in the central portion of the panel. Also in the present embodiment, all the power of the microlens can be constant regardless of the position, so that the manufacturing process can be simplified.

In the present embodiment, the microlenses are assumed to be a two-dimensional array similar to a fly's eye lens, and there is also assumed the corresponding two-dimensional variation in the thickness of the microlens substrate, but this concept is likewise applicable to a one-dimensional array of microlenses. In such a one-dimensional microlens array, the thickness of the microlens substrate can be varied one-dimensionally along the direction of array of the microlenses as the same as the above embodiment. Such a configuration may be effective in alaterally oblong image frame, such as of the high definition television.

Also in the foregoing embodiment there are employed GI microlenses, but there may also be employed a method of forming ordinary convex microlenses for example of resin on a glass substrate instead of the microlens substrate 3a.

Figure 10:
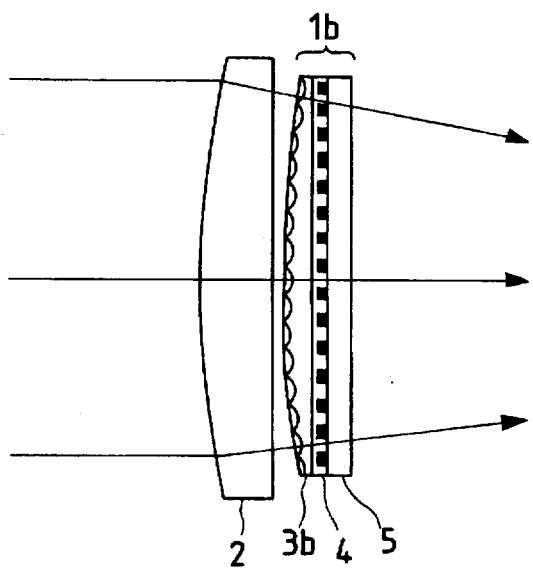
FIG. 10 is a cross-sectional view of another embodiment in the first aspect of the liquid crystal display panel of the present invention.

FIG. 10 illustrates a second embodiment, in which a microlens substrate 3b, bearing microlenses thereon, is linearly tapered in the only peripheral portions. The microlens bearing surface of the microlens substrate has to be curved in order that the distance between the microlens 8 and the aperture 7 along the optical axis of the incident light is always adjusted to be constant regardless of any position, but, in the present embodiment, said curved form is approximated by a tapered surface in the peripheral portion. Consequently the manufacturing process can be further simplified.

As explained in the foregoing, the liquid crystal display panel in the first embodiment of present invention can provide a satisfactory transmittance even in the peripheral portion of the panel as in the central portion thereof, thereby being capable of achieving uniform display of high quality over the entire area of the panel. Also the panel can be provided by low cost because of a simpler fabricating process.

In the foregoing embodiments, the distance between the microlens and the liquid crystal layer is gradually decreased from the central portion of the display panel toward the peripheral portion thereof, because it is assumed that a condenser lens is provided at the entrance side of the liquid crystal display panel. However, in case of a somewhat divergent light beam entering the panel or the absence of said condenser lens, said distance may be formed to be gradually decreased from the peripheral portion of the display panel toward the central portion thereof.

Figure 11:
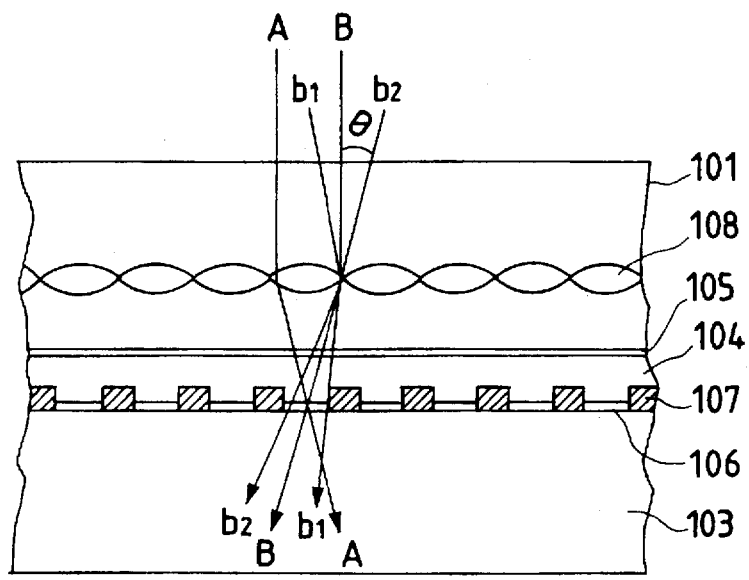
FIG. 11 is a cross-sectional view of a second embodiment of the present invention.

FIG. 11 is a cross-sectional view showing the configuration of a second embodiment of the liquid crystal display device of the present invention.

Figure 1:
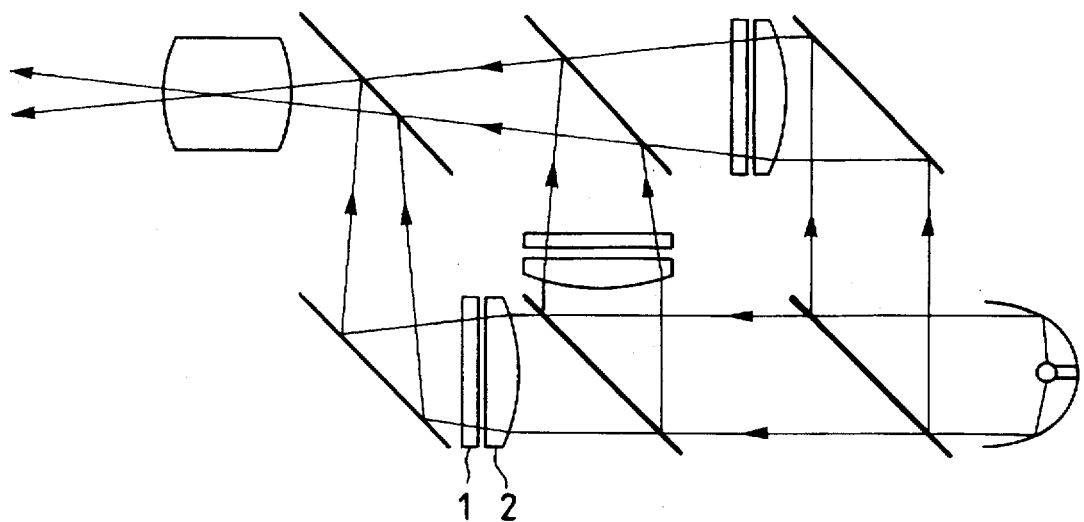
FIG. 1 is a view showing the optical configuration of a prior art liquid crystal projector.
Figure 2:
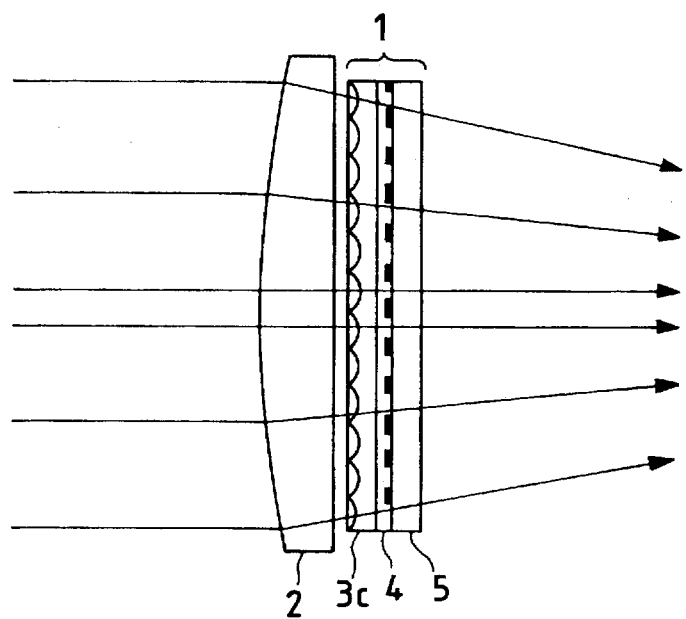
FIG. 2 is a cross sectional view of a liquid crystal display panel shown in FIG. 1.
Figure 3A:
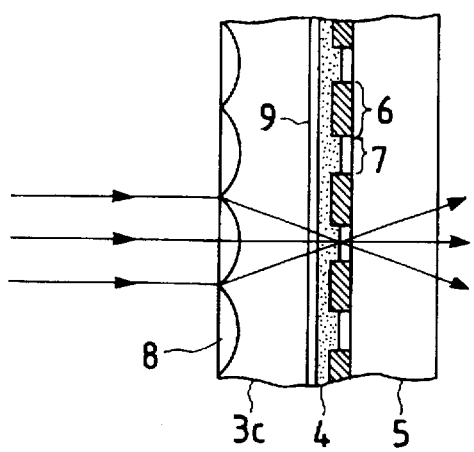
FIGS. 3A and 3B are partial magnified cross-sectional views of a prior art liquid crystal display panel respectively in a central portion and a peripheral portion thereof.
Figure 3B:
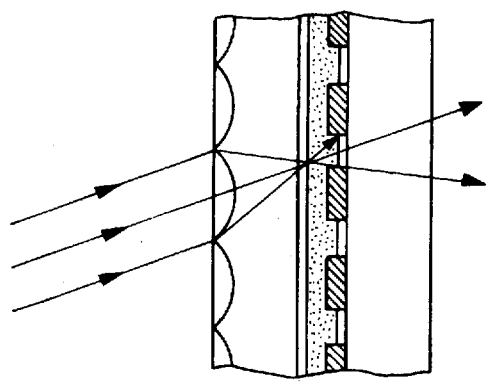
Figure 4:
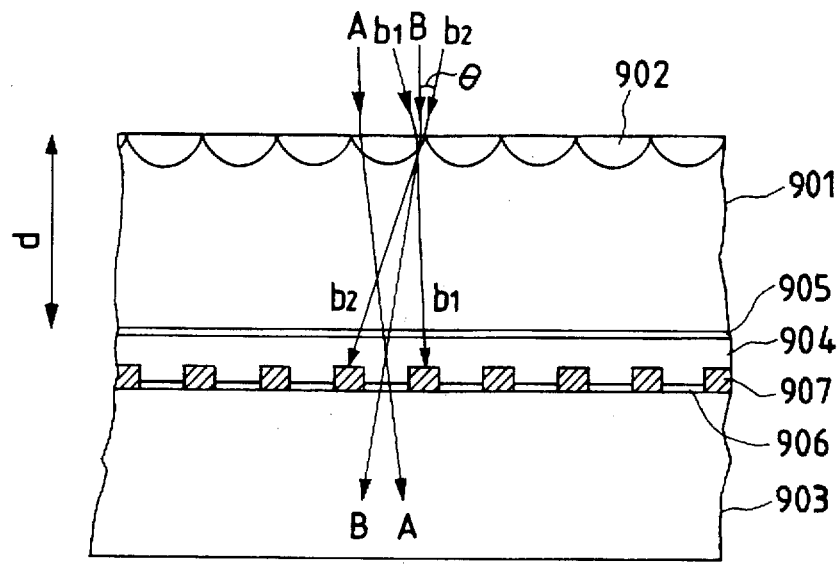
FIG. 4 is a cross-sectional view of a prior art liquid crystal display panel.
Figure 5:
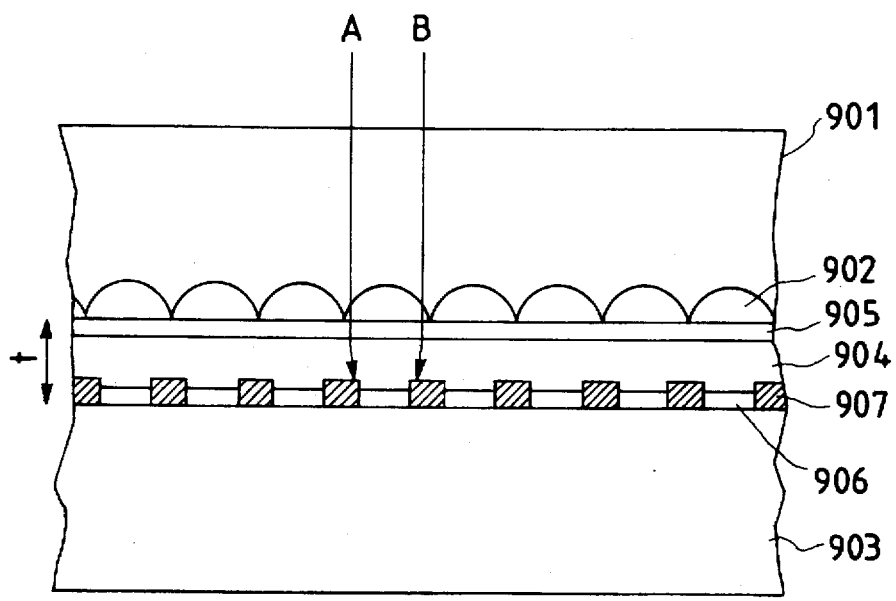
FIG. 5 is a cross-sectional view of a prior art liquid crystal display panel.

In the present embodiment, a liquid crystal layer 104 is sandwiched between a glass substrate 101 and a TFT substrate 103. A TFT substrate 103, a liquid crystal layer 104, a counter electrode 105, and pixel electrodes 106 and TFT's 107 arranged at a pitch of 50 µm are similar to the TFT substrate 903, liquid crystal layer 904, counter electrode 905, pixel electrodes 906 and TFT's 907 shown in FIG. 4, and will not, therefore, be explained further.

The glass substrate 101 of the present embodiment is provided therein with a buried-type lens array 108 of distributed refractive index type, corresponding to the arrangement of the pixel electrodes 106.

Said buried-type lens array 108 was prepared through the following steps:

1) A KF-3 glass substrate (containing 12 wt. % of $Na_2O$; nd=1.51, $v_d$=54.7) of a thickness of 1.1 mm was subjected to the deposition, on both faces, of Ti films of a thickness of 1-2 µm, by sputtering or evaporation;

2) Apertures were formed photolithographically, corresponding to the lens forming positions (with a pitch of 50 µm on one face (mask formation));

3) Ion exchange was conducted for a predetermined period in molten salt (520° C.) of $Tl_2So_4:ZnSO_4:K_2SO_4$=40:40:20 (mol. %) (formation of lenses of a diameter of 50 µm);

4) The glass substrate was taken out of the molten salt, then gradually cooled and washed with warm water;

5) Ti films (mask) were removed by etching or polishing;

6) Ion exchange was conducted again for a predetermined period in molten salt (520° C.) of $Na_2SO_4$: $K_2SO_4:ZnSO_4$=25:25:50 (mol. %) free from Tl (lens burying);

7) Washing : same as the step (4).

In the lens burying of the step (6), the ion exchange time is so determined that the burying depth becomes equal to the focal length of the lenses. The size and arrangement of each lens correspond to the pixel electrodes 106 in the liquid crystal layer 104.

The glass substrate 101, in which the buried lens array 108 is formed as explained above, is used as the counter substrate of the liquid crystal display device as shown in FIG. 11, and is aligned thereto in such a manner that the optical axes of the light passing through said buried lens array 108 respectively correspond to the centers of the pixel electrodes 106 on the TFT substrate 103 to thereby form a liquid crystal display cell.

The difference An in the refractive index between the buried lens array 108 and the glass substrate can be made about 0.1 in the above-explained process. The pixel pitch, based on the arrangement of the pixel electrodes 106, is 50 µm, so that the diameter of lenses of the buried array 108 is also selected as 50 µm. Under these conditions, the focal length and buried depth of the lens array 108 of the present embodiment are selected as 200 µm.

When illuminating light is introduced into the above-explained liquid crystal display device, the principal rays A, B of the illuminating light, shown in FIG. 11, are concentrated on and pass through the pixel electrode 106 and the liquid crystal layer 104 (effective pixel area) thereon. Also for oblique incident rays, such as $b_1$ and $b_2$, the spreading on the liquid crystal layer 104 corresponding to the spreading angle θ from the principal ray is relatively small because the buried lens array 108 is positioned close (200 μm) to the liquid crystal layer 104, so that the oblique incident ray with a large spreading angle θ can also pass through the effective pixel area.

Consequently the present embodiment can generally improve the light transmittance in comparison with the prior art configuration.

The buried lens array 108 may be formed within the TFT substrate 103 instead of the glass substrate 101, with the identical effects and advantages as in the above-explained embodiment. In such case, however, the light is introduced from the side of the TFT substrate. Also in such case, the ion exchange time may be so regulated that the focal length of the buried lens array 108 becomes shorter by 7–8 μm, corresponding to the thickness of the liquid crystal layer 104. In such a manner, the principal rays of the illuminating light are concentrated around the pixel electrodes 106 of every pixels.

Figure 12:
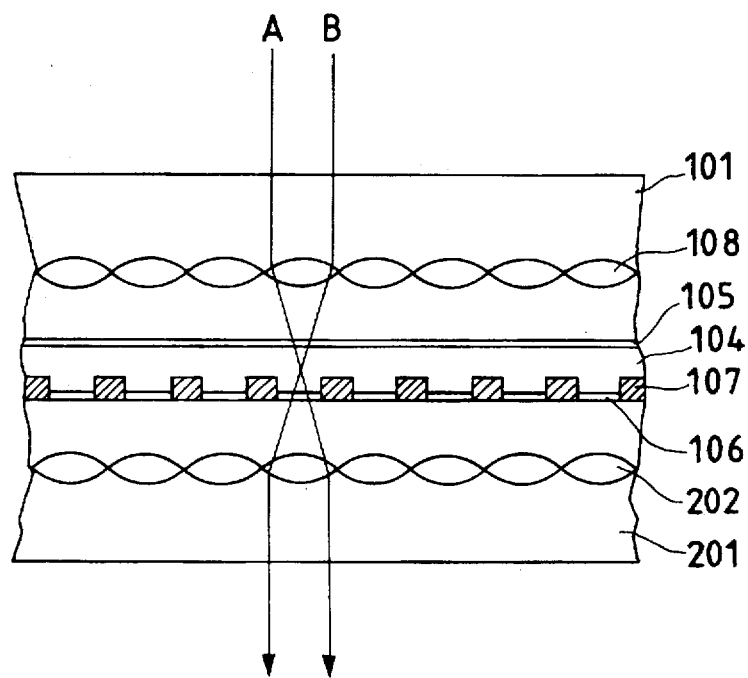
FIG. 12 is a cross-sectional view of another second embodiment of the present invention.

FIG. 12 is a cross-sectional view of another embodiment, in which the TFT substrate 103 shown in FIG. 11 is replaced by a TFT substrate 201 provided therein with a buried lens array 202. Since other structures are same as those in FIG. 11, they will be numbered similarly and will not explained further.

The buried lens array 202, formed in the TFT substrate, similar to that 108 formed in the glass substrate 101. These buried lens arrays 108 and 202 in the substrates are so aligned that the optical axes connecting the respectively corresponding lenses coincide with the centers of the effective pixel areas.

The illuminating light is condensed by the buried lens array 108 onto each effective pixel area, and is then converted into a telecentric beam by the microlens array 202.

Consequently the present embodiment not only achieves an improvement in the transmittance as in the embodiment shown in FIG. 11, but also provides a telecentric emerging light of reduced spreading (at least of a same level as that of the illuminating light), and is therefore adapted for use in a projector or the like.

Figure 13:
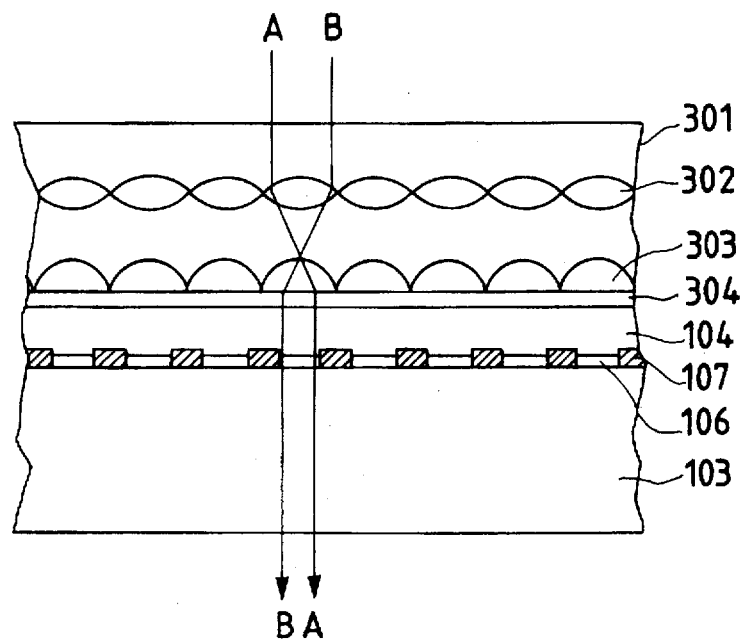
FIG. 13 is a cross-sectional view of still another second embodiment of the present invention.

FIG. 13 shows another embodiment of the present invention, wherein the glass substrate 101 shown in FIG. 11 is replaced by a glass substrate 301 provided therein with a buried lens array 302 and also provided, on a surface at the side of the liquid crystal layer 104, with a lens array 303. The other structures, similar to those in the embodiment shown in FIG. 11, are numbered similarly and will not be explained further.

The buried lens array in the glass substrate 301 is achieved similarly as in the embodiment shown in FIG. 11. Also the lens array 303, formed on the face at the side of the liquid crystal layer 104, is formed by the steps (1) to (5) in the embodiment shown in FIG. 11.

In said lens array 303, smaller lenses with a larger power are formed by more reducing the ion exchange time in the step (3). In the present embodiment, the lenses of the array 303 are formed with a substantially same power, and are so positioned as to respectively correspond to the effective pixel areas. Also the buried depth of the lens array 302 is made larger than the focal length of the lenses constituting said array 302, by extending the ion exchange time of the step (6).

In the present embodiment, the illuminating light is concentrated by the buried lens array 302, then spreaded again and enters the lens array 303, whereby the emerging light beam is transformed into a telecentric state and is narrowed in the width by the arrangements of the lens arrays, thus passing through the effective pixel area in this state.

Consequently the present embodiment can provide similar effects as in the embodiment shown in FIG. 12, and be adapted for use in similar applications.

Figure 14:
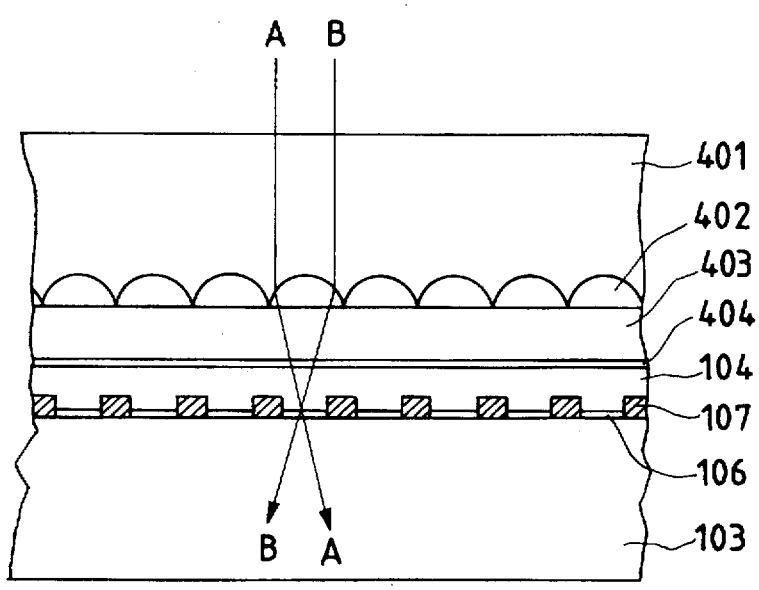
FIGS. 14 to 16 are cross-sectional views of still other second embodiments of the present invention.

FIG. 14 is a cross-sectional view showing another embodiment, wherein the glass substrate 101 shown in FIG. 11 is replaced by a glass substrate 401 provided with a lens array 402 on a face at the side of the liquid crystal layer 104, in combination with a transparent glass sheet 403 and a counter electrode 404. Other structures, being same as those in FIG. 11 are numbered same and will not be explained further.

In the present embodiment, the lens array 402 is formed on the surface of the glass substrate through the aforementioned steps (1) to (5), then a transparent glass sheet (or a polymer sheet) of a thickness corresponding to the focal length of the lens array 402 is adhered, and the counter electrode 404 is formed. Such elements are positioned opposite the TFT substrate 103, and the liquid crystal display device is obtained by filling the gap therebetween with the liquid crystal layer 104. The lenses constituting the lens array 402 are so positioned as to respectively correspond to the effective pixel areas.

As the illuminating light is condensed by the lens array 402 onto the effective pixel areas and passes through said areas, there can be obtained effects and advantages same as those in the embodiment shown in FIG. 11. Also the present embodiment can simplify the fabricating process, since the step (6) can be omitted.

Furthermore, similar effects and advantages can be attained by effecting the formation of the lens array and the adhesion of transparent glass sheet on the TFT substrate.

Figure 15:
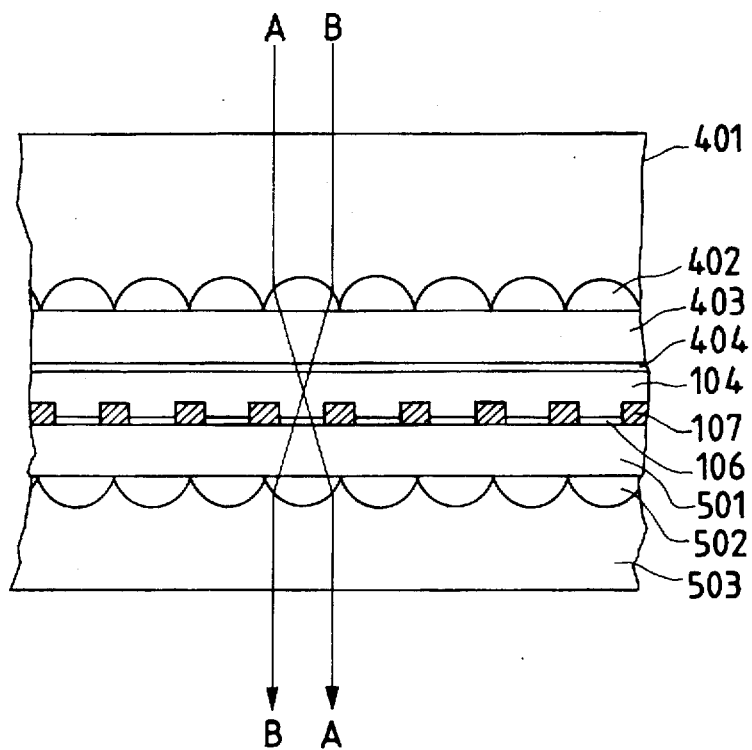

FIG. 15 shows another embodiment of the present invention, wherein formation of a lens array 502 and adhesion of a transparent glass sheet 501 are conducted on the TFT substrate 503 in the identical manner as in the embodiment shown in FIG. 14, in addition to the glass substrate 401. Other structures, being same as those in the embodiment shown in FIG. 14, are numbered same and will not be explained further.

In the present embodiment, the glass substrate 401 and the TFT substrate 503 are symmetrical with respect to the liquid crystal layer 104, as in the embodiment shown in FIG. 12.

For this reason, the present embodiment provides similar effects and advantages as those in the embodiment shown in FIG. 12, and can be adapted for use in similar applications.

Formation of a buried lens array by ion exchange method in the TFT substrate may undesirably affect the performance of TFT, but, in the present embodiment, such detrimental influence can be avoided by the presence of the transparent glass sheet between the lens array and the TFT's. Said effect can be further enhanced if said transparent glass sheet is composed of glass free from alkali ions.

Figure 16:
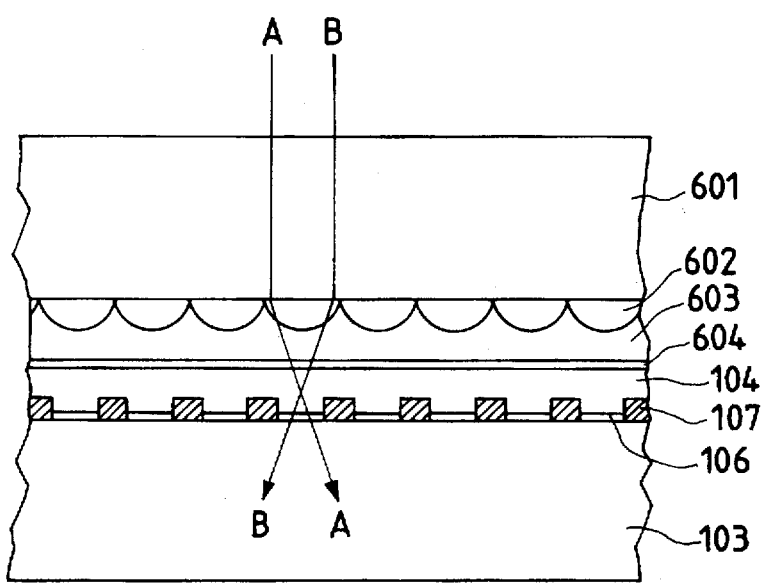

FIG. 16 shows another embodiment of the present invention, in which the glass substrate 101 in the embodiment shown in FIG. 11 is replaced by a glass substrate 601 on which, on a face at the side of the liquid crystal layer 104, a resin microlens array 602 is formed by a method disclosed in the Japanese Patent Publication No. 60-59752, then planarized with a resin layer 603 of a lower refractive index, and a counter electrode 604 is formed thereon. Other structures, being same as those in the embodiment shown in FIG. 11, are numbered same and will not be explained further.

As the thickness of the resin layer 603 is selected equally to the focal length of the resin microlens array 602, the effects and advantages of the present embodiment are identical with those of the embodiment shown in FIG. 14.

In the following there will be explained preferred arrangement of the components, taking the embodiment shown in FIG. 14 as an example.

Figure 17:
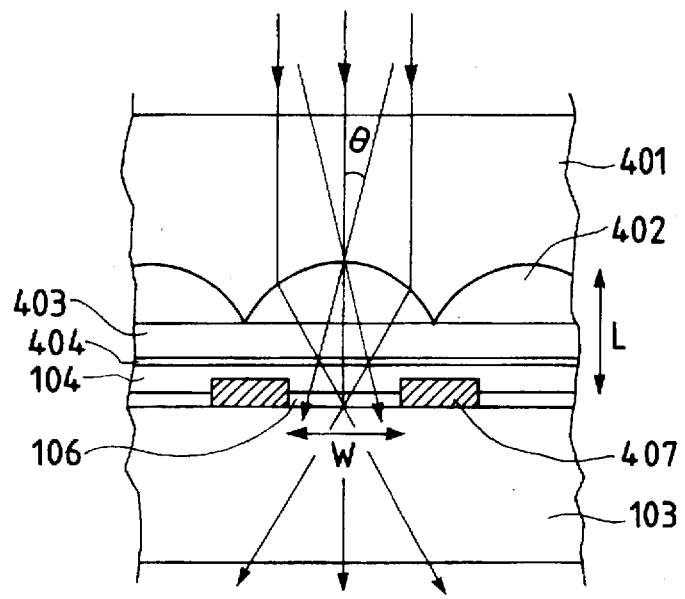
FIG. 17 is a view showing a preferred arrangement of microlenses in the present invention.

FIG. 17 is a partial magnified view of the embodiment shown in FIG. 14.

Incident light with certain spreading can be efficiently introduced into the effective pixel areas by arranging the components so as to satisfy following relationship:

$$2L \cdot \tan \theta \leq W$$

wherein L is the distance between the lens array 402 and the liquid crystal layer 104; W is the effective pixel width in the liquid crystal layer 104; and θ is the spreading angle of the incident light.

In this state, there stands following relationship:

$$L \cong n \cdot f$$

wherein n is the refractive index of the transparent glass sheet 403 (corresponding to the glass substrate 101 in the first embodiment) between the lens array 402 and the liquid crystal layer 104, and f is the focal length of the lens array 402.

Figure 18A:
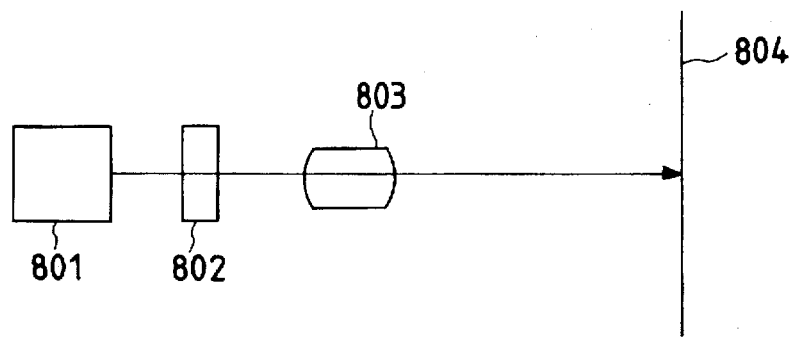
FIGS. 18A and 18B are views showing the configuration of projectors utilizing the present invention, respectively of a transmissive projector and a reflective projector.
Figure 18B:
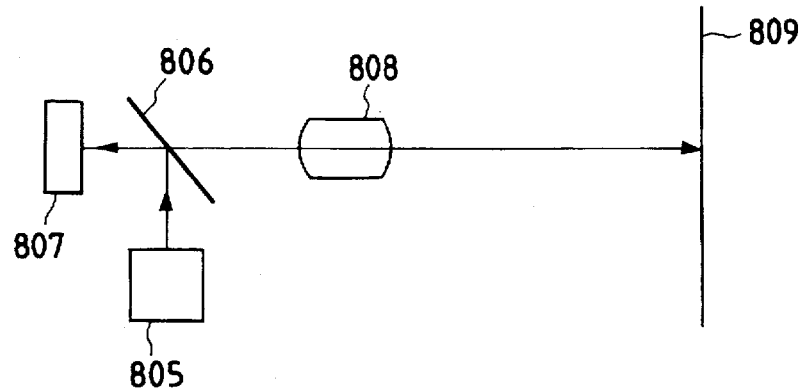

The liquid crystal display devices shown in the foregoing embodiments are applicable in projectors as shown in FIGS. 18A and 18B.

FIG. 18A shows the structure of a transmissive projector, in which the light beam emerging from an illuminating system 801, provided with a lamp, a reflector, a condenser lens and so on is transmitted in succession by a transmissive liquid crystal display panel 802 of the present invention and a projection lens system 803, and is projected onto a screen 804.

FIG. 18B shows the structure of a reflective projection, in which the light beam emerging from an illuminating system 805 is reflected by a beam splitter 806, then enters and is reflected by a reflective liquid crystal display panel 807 of the present invention, then transmitted in succession by the beam splitter 806 and a projection lens system 803, and is projected onto a screen 809.

Both structures can provide with an extremely sharp image, since said panels are of an improved transmittance according to the feature of the present invention.

As explained in the foregoing, the present invention has an effect to further improve the light transmittance for the illuminating light, by forming microlenses in a suitable position close to the liquid crystal layer.

In the following there will be explained embodiments for preventing intrusion of alkali ions from the glass substrate to TFT's.

Figure 6:
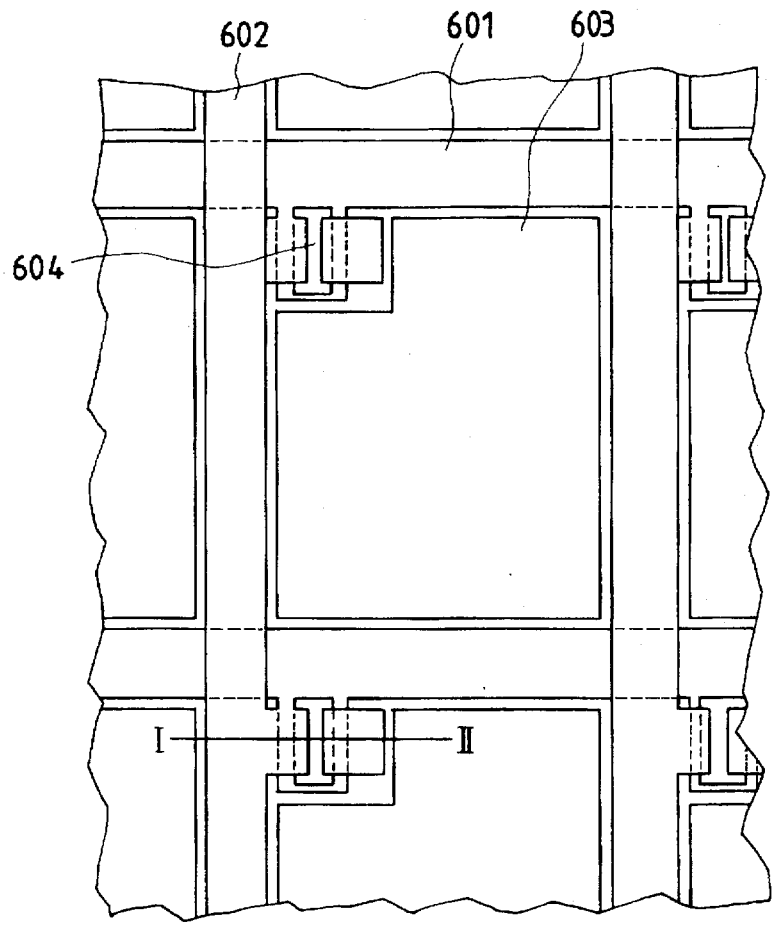
FIG. 6 is a plan view of a prior art liquid crystal display panel.
Figure 7:
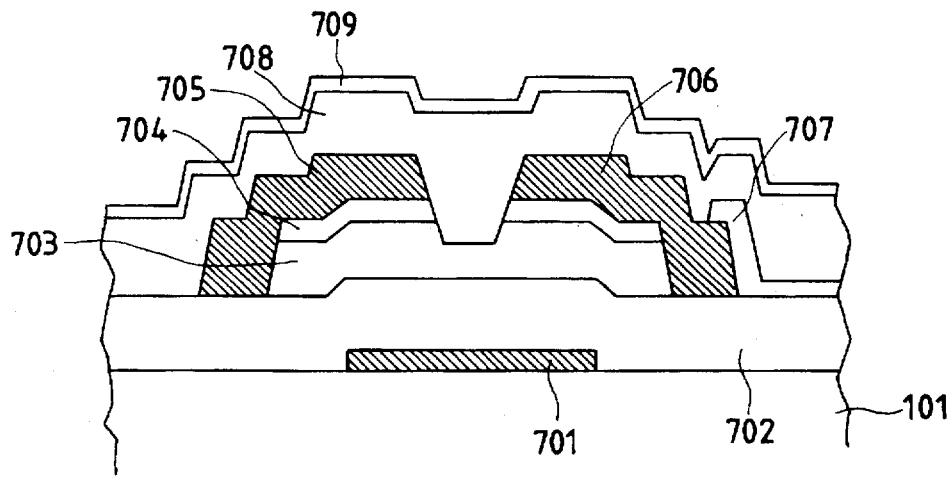
FIG. 7 is a magnified cross-sectional view of a TFT of a prior art liquid crystal display panel.

As already known, there have been made trials for improving the efficiency of light utilization, by an increase in the aperture rate through the combination of a liquid crystal display panel as shown in FIG. 6 and an array of microlenses respectively corresponding to each pixel of said liquid crystal display panel. Such microlens array can be prepared, for example, by forming a distribution of refractive index, through permeation of thalium ions and the like into alkaline glass by ion exchange as explained before, and, in such method, the use of an alkaline glass substrate is indispensable.. Following description assumes the use of a such liquid crystal display panel provided with such microlens array. However, regardless whether the microlens array is present or not, the present invention is applicable to any configuration involving possibility of intrusion of alkali ions from the substrate to TFT, as in the case of alkaline glass substrae.

Figure 19:
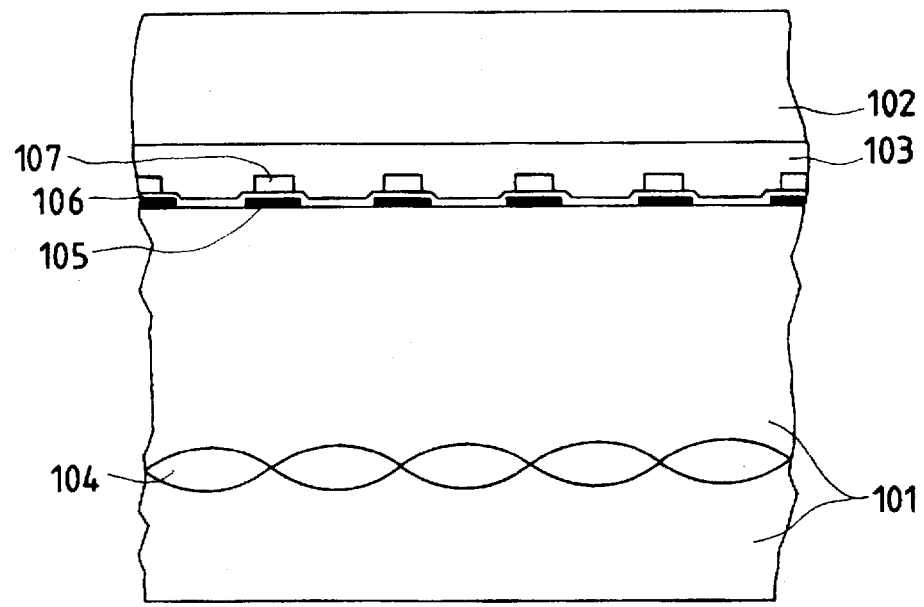
FIG. 19 is a cross-sectional view of third embodiment of the liquid crystal display panel of the present invention.

FIG. 19 is a cross-sectional view of a liquid crystal display panel in a third aspect of the present invention.

A liquid crystal layer 103 is sandwiched between glass substrates 101 and 102. Within the substrate 101, there is formed a microlens array 104, of which refractive force is obtained by refractive index distribution formed corresponding to the pixels (a pitch of 50 μm) of the displayed image. On a surface of the substrate 101, opposed to the liquid crystal layer 103, there integrally formed a Ti mask 105 composed of a thin titanium film, an insulating film 106 consisting of silicon nitride ($SiN_x$) or silicon oxide ($SiO_2$), and a TFT 107, corresponding to each pixel. Though not illustrated in Figs, the glass substrate 101 also bears row and column electrodes for actuating the TFT of each pixel, transparent pixel electrodes consisting of ITO, and a liquid crystal alignment film as shown in FIG. 6. Also a surface of the opposed glass substrate 102, facing the liquid crystal layer 103, provides with a transparent electrode and a liquid crystal alignment film. Illuminating means consisting of an unrepresented light source, an unrepresented reflector and so on is so positioned that the illuminating light beam therefrom enters the glass substrate 101 and emerges from the substrate 102.

The glass substrate 101 of the present embodiment is provided therein with a buried lens array 104 of refractive index distribution type, corresponding to the arrangement of the pixel electrodes. The forming method of said buried lens array 104 is same as explained in the foregoing embodiments, and will not, therefore, be explained further.

Figure 20:
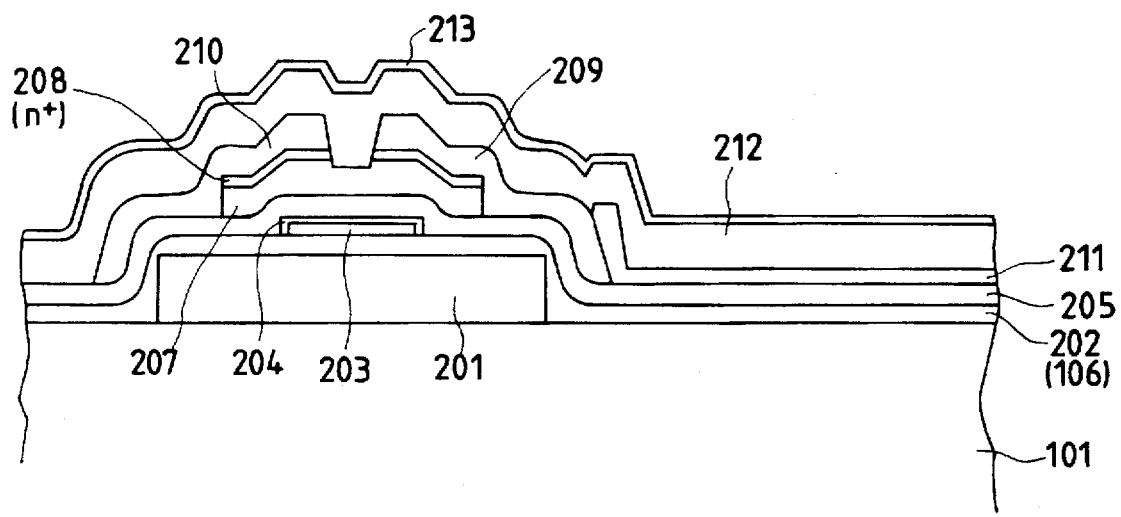
FIG. 20 is a magnified cross-sectional view of a TFT of third embodiment of the present invention.

FIG. 20 is a magnified cross-sectional view of a TFT, formed corresponding to each pixel on the glass substrate 101, after formation of said microlens array 104. The components of said TFT will be explained in the following, according to the fabricating process.

At first, on the glass substrate 101, a Ti film of a thickness of 1–2 μm is formed by sputtering or evaporation. Said Ti film is left by a photolithographic process, only in portions where TFT's are to be formed, thereby obtaining a Ti mask 201. A gate insulation film 202, consisting of silicon nitride ($SiN_x$) or silicon oxide ($SiO_2$) of a thickness of ca. 2000 Å, is formed over the entire area of the substrate, then a gate electrode 203 consisting of aluminum or chromium or and a gate oxide film 204 are formed, and a gate insulation film 205 of $SiN_x$ of $SiO_2$ having a thickness of ca. 2000 Å is formed over the entire area of the substrate. Then, on the gate electrode, there are formed, in succession, an amorphous silicon (a-Si) layer 207 of a thickness of ca. 1000 Å, an n-type a-Si ohmic layer 208 of a thickness of ca. 500 Å, and electrode areas of aluminum or chromium of a thickness of ca. 5000 Å. Said ohmic layer and electrode areas are divided by etching into a source electrode 209 and a drain electrode 210. Then a transparent electrode 211, consisting of an ITO film having a thickness of ca. 1000 Å, is formed for connection to the source electrode 209 in each pixel. Finally a protective insulation film 212 of $SiN_x$ or $SiO_2$ of a thickness of ca. 3000 Å is formed over the entire area of the glass substrate, and a liquid crystal alignment film 213, consisting of rubbed polyimide of a thickness of ca. 500 Å is formed thereon.

In the present embodiment, the Ti mask 201 serves mainly to prevent intrusion of alkali ions from the glass substrate 101 to the a-Si layer 207 or the insulation layer between the a-Si layer 207 and the gate electrode 203. Consequently, said Ti mask 201 is preferably formed over broader than the lower face of the a-Si layer 207, in order to prevent ion intrusion from the lateral direction. More preferably it is formed as wide as possible, to such extent that plural light beams focused by the microlens array 104 in FIG. 19 are not hindered. The Ti mask layer 201 also serves as a light intercepting layer, for preventing generation of a photocurrent, by the entry of the illuminating light into the a-Si layer 207.

The gate insulation film 202 (106 in FIG. 19) serves to insulate the gate electrode 203 and the Ti mask 201, and to prevent lateral ion intrusion into the a-Si layer 207, in cooperation with the gate insulation film 205. Though the $SiO_2$ or $SiN_x$ film constituting the gate insulation films 202 and 205 are inferior to Ti for the ion intercepting power, a sufficient ion intercepting effect can be obtained because the effective layer thickness to the a-Si layer 207 is larger for the lateral ion intrusion.

As explained in the foregoing, formation of a layer of a higher ion intercepting power, than the other parts, under the a-Si layer 207 prevents the ion permeation from the glass substrate 101, including therein the microlens array 104 of distributed refractive index type and containing alkali ions therein, to the channel area of the TFT 107, namely the layer between the source and drain electrodes and the gate electrodes, particularly the a-Si layer 207, thereby maintaining satisfactory function of the TFT 107.

Each Ti mask 201 may be charged for some reason. Since it is close to the gate electrode 203, the Ti masks 201 are preferably maintained at a same potential in order to achieve stable operation of the TFT's 107. For this purpose a mask pattern may be so formed as to mutually connect the masks of the different pixels and may be grounded.

Figure 21:
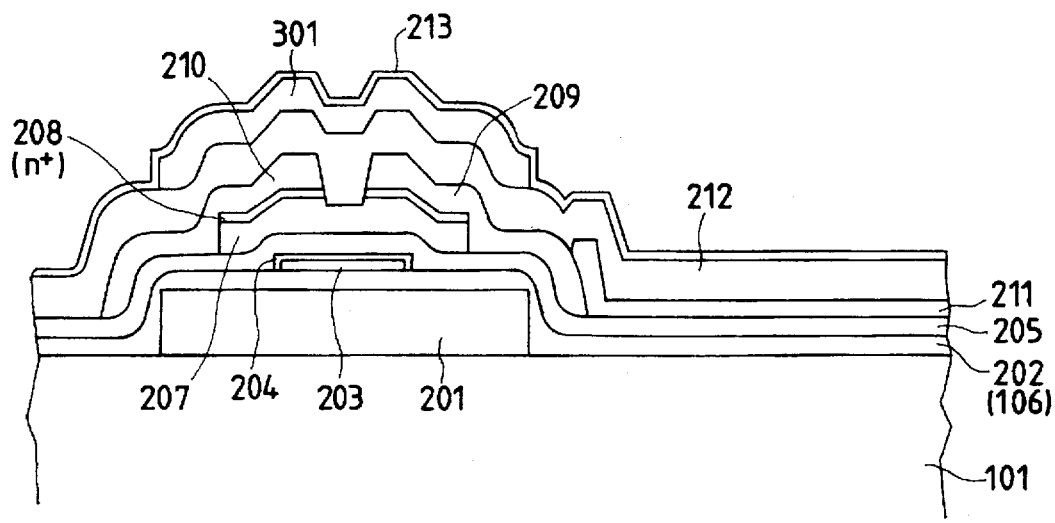
FIG. 21 is a magnified cross-sectional view of a TFT of the other embodiment of the present invention.

FIG. 21 is a magnified corss-sectional view of a TFT portion in a liquid crystal display panel constituting another embodiment of the present invention, which is different from the foregoing one in that a Ti mask 301 of a thickness of 0.5–2 μm is provided between the protective insulation film 212 and the liquid crystal alignment film 213 shown in FIG. 20.

In the configuration shown in FIG. 20, a small amount of the alkali ions present within the glass substrate 101 entering the liquid crystal layer 103 through the pixel electrode area (through gate insulation films 202, 205, pixel electrode 211 and protective insulation film 212), and such alkali ions permeate into the TFT, thus deteriorating the characteristic thereof. Thus, the Ti mask 301 additionally provided on the upper portion of the TFT in the present embodiment serves as an intercepting layer against the ions permeating through the liquid crystal layer 103. It also prevents generation of photocurrent in the a-Si layer 207, by a stray light from the side of the liquid crystal layer 103. Also as in the Ti mask 201 shown in FIG. 20, there may be provided a grounded mask pattern, whereby said Ti mask 301 can exert, in cooperation with the Ti mask 201, a shield effect for protecting the TFT of each pixel from external perturbation.

As explained in the foregoing, the characteristic of TFT can be maintained in satisfactory manner by thickening an ion intercepting layer having a cross section consisting of TFT or an larger area than the cross section, to state concretely, by forming ion intercepting layers on both at the side of the liquid crystal layer 103 of the a-Si layer 207 (208) and at the side of the glass substrate 101.

Figure 22:
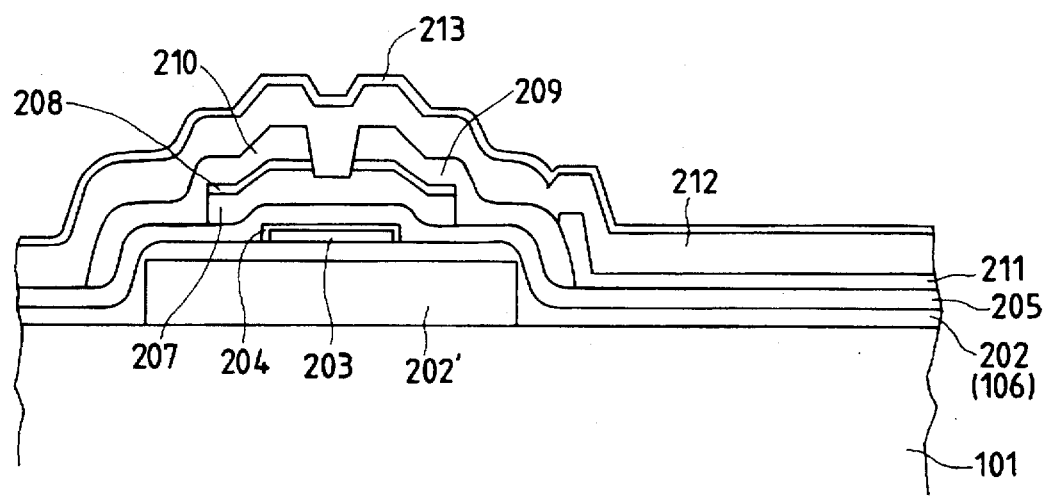
FIGS. 22 to 24 are magnified cross--sectional views of a TFT of still other embodiments in the third embodiment of the present invention.

FIG. 22 shows another embodiment, in which the Ti mask 201 serving as the ion intercepting layer in FIGS. 20 and 21 is replaced by a $SiO_2$ or $SiN_x$ mask and the like which are same in material as the insulation films 202, 205, 212. Thus, the ion intercepting power can be hastened by an increase in the thickness of the insulation film immediately under the TFT. In this case, a $SiO_2$ mask 202' is selectively formed on the glass substrate 101, and then the gate insulation layers and TFT may be formed like the prior art manner.

For the pixel electrode area, however, it is important to maintain the layers under the alignment film 213 as thin as possible, thereby and prevent the deterioration of performance of said alignment film and maintaining satisfactory liquid crystal alignment. This fact can apply to all the embodiments.

As the ion intercepting mask is translucent in this case, the photocurrent generation in the a-Si layer 207 is to be prevented by the gate electrode 203. Thus, it becomes unnecessary to effect extra light interception by the gate electrode 203 in an area where translucency is desired, such as the pixel electrode area, so that an increase of the aperture rate can be obtained as a subsidiary effect.

Figure 23:
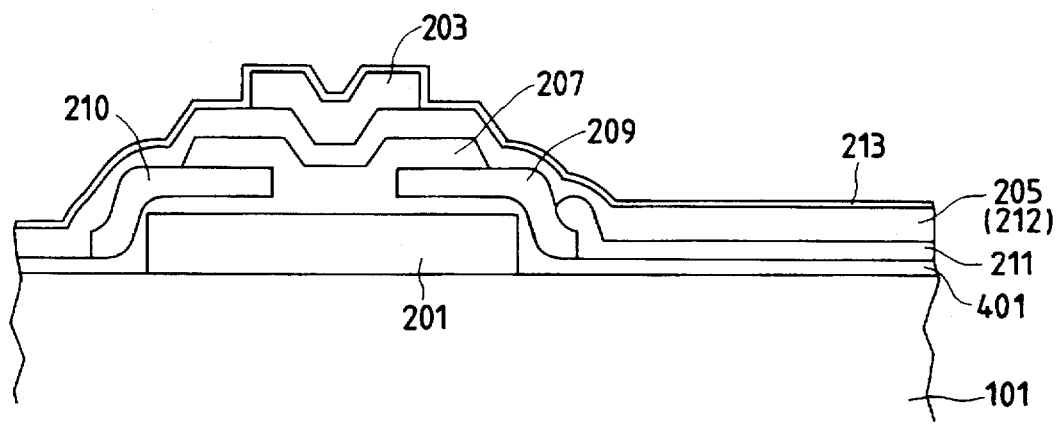

FIG. 23 shows another embodiment, in which the present invention is applied to a normal stagger type a-Si TFT.

The method of microlens array formation will be omitted from the explanation as it is same as in the foregoing embodiments. Elements equivalent in function to those in the foregoing embodiments are represented by same numerals regardless of the positions or forms thereof. Also in this embodiment, the Ti mask 201 positioned under the a-Si layer 207 serves to prevent direct ion permeation from the glass substrate 101 to the a-Si layer 201. Also an insulation film 401 of $SiO_2$ or $SiN_x$ of a thickness of ca. 2000 Å and the gate insulation film 205 have sufficient ion intercepting effect because of an increased effective thickness to the a-Si layer 207 against the ion permeation to the a-Si layer 207 from the lateral direction.

In the present embodiemnt, there may also be employed a configuration in which a protective insulation film is added on the upper portion of the gate electrode for improving the insulation between the gate electrode 203 and the liquid crystal layer 103, or a configuration of further including an ion intercepting layer of a titanium film thereon.

Figure 24:
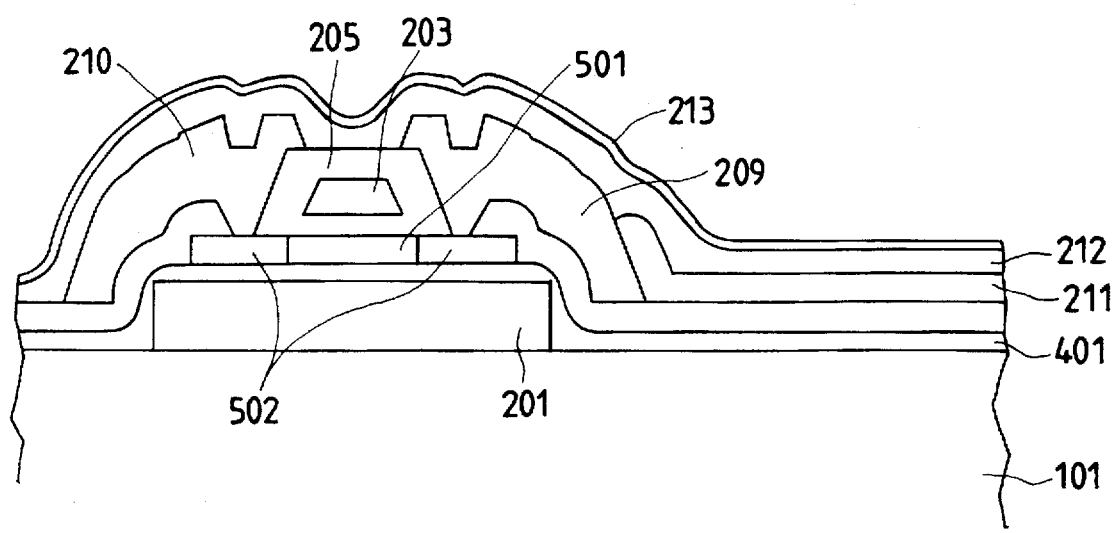

FIG. 24 shows another embodiment, in which the present invention is applied to a planar-type TFT employing polycrystalline Si (p-Si), wherein components equivalent in function to those in the foregoing embodiments are represented by same numerals.

In the present embodiment, the Ti mask 201 having ion intercepting effect is formed under a p-Si layer 501, and an ohmic layers contacting the source electrode 209 and the gate electrode 210. Also insulation films 401, 212, principally consisting of $SiO_2$ have ion intercepting function, though not perfect.

In the foregoing embodiments, the Ti mask 201 serving as the ion intercepting layer is formed separately from the Ti mask for forming the microlens array 104, but these two purposes may be also met by a single Ti mask, as will be explained in the following embodiment. In such case, if the Ti mask for microlens array formations so large to cover, the pixel electrode area where translucency should be required, Ti thin film is added by sputtering and the like, so that a part of said mask may be removed by etching in a case that larger shape and area are needed. Also if the Ti mask 201 for ion interception has to be larger, the Ti film may be added for example by sputtering and then removed by etching in the unnecessary portions.

Figure 25:
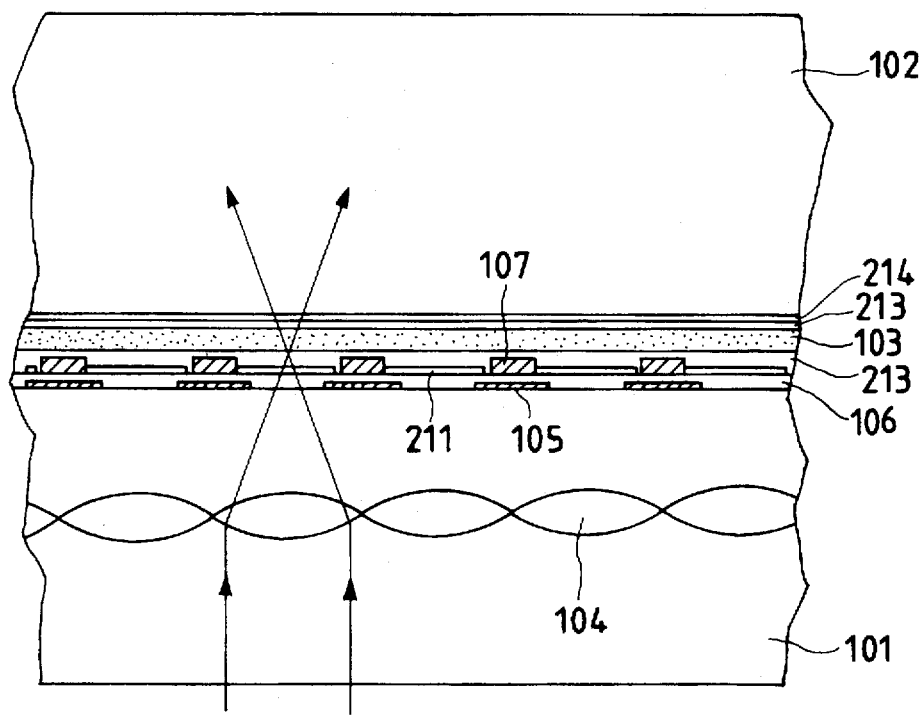
FIGS. 25 and 26 are cross-sectional views of a liquid crystal display panel of other third embodiments of the present invention.

FIG. 25 shows another embodiment, in which components equivalent in function to those in the foregoing embodiments are represented by same numerals.

A Ti mask 105 is provided for microlens array formation, and the microlenses 104 are buried within the TFT glass substrate 101 as shown in FIG. 25. The panel of the present embodiment is prepared by the following steps of:

1) forming, on a Na-containing glass substrate 101, a Ti mask pattern 105 of a thickness of 1–2 μm by sputtering or evaporation, combined with a photolithographic process;
2) effecting ion exchange in a thallium-containing molten salt (lens formation);
3) rinsing with warm water;
4) effecting ion exchange in a thallium-free Na-containing molten salt (lens burying);
5) rinsing with warm water;
6) forming an insulating SiO$_2$ layer of a thickness of 2 μm by sputtering;
7) forming a pixel electrode pattern 211 consisting of ITO of a thickness of 0.1 μm;
8) forming TFT 107, signal electrodes and scanning electrodes with such an alignment that the TFT is positioned directly above the Ti mask pattern 105;
9) forming and rubbing an alignment film 213;
10) forming a cell with the TFT substrate prepared through the above steps 1)–9) and a counter substrate on which a counter electrode 214 and an alignment film 213 are formed in ordinary manner, by the medium of a gap forming material;
11) filling the liquid crystal 103 and sealing the cell.

In the lens burying process of step 4, the ion exchange time is so selected that the buried depth becomes equal to the focal length of the lenses.

The liquid crystal display panel of the present embodiment fabricated as explained above, improves the efficiency of light utilization as the illuminating light is efficiently condensed by the microlenses into the pixel apertures as indicated by arrows in FIG. 25, and also prevents the photocurrent generation and, as each TFT is shielded from light by the Ti mask. Also the present embodiment simplifies the manufacturing process, since the Ti mask need not be removed after the formation of the microlenses. Furthermore the present embodiment enables formation of microlenses and TFT's in monolithic manner, so that the alignment of the microlenses, the Ti mask, the TFT's and the pixel apertures, can be more accurately achieved.

Figure 26:
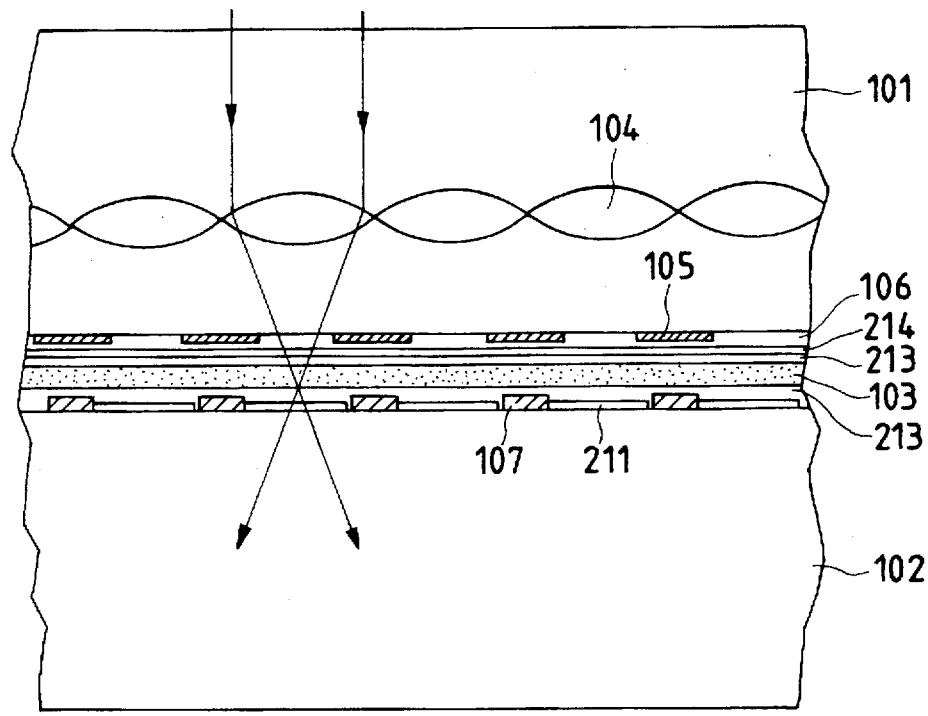

FIG. 26 shows another embodiment, wherein components equivalent in function to those in the foregoing embodiments are represented by same numerals.

Ti mask 105 is provided for microlens forming, and microlenses 104 are buried within the counter glass substrate 101 as shown in FIG. 26. The panel of the present embodiment is prepared by the following steps of:

1) forming, on a Na-containing glass substrate 101, a Ti mask pattern 105 of a thickness of 1–2 μm by sputtering or evaporation, combined with a photolithographic process;
2) effecting ion exchange in a thallium-containing molten salt (lens formation);
3) rinsing with warm water;
4) effecting ion exchange in a thallium-free Na-containing molten salt (lens burying);
5) rinsing with warm water;
6) forming an insulating SiO$_2$ layer of a thickness of 2 μm by sputtering;
7) forming a counter electrode 214 consisting of ITO of a thickness of 0.2 μm;
8) forming and rubbing an alignment film 213;
9) forming a cell with the counter substrate formed through the steps 1)–8), and a TFT substrate, on which TFT's 107, pixel electrodes 211 and an alignment film 213 and the like are formed by ordinary manner, across a gap forming material, with alignment in such a manner that the Ti mask pattern is positioned directly above the TFT;
10) filling the cell with liquid crystal 103 and sealing the cell.

In the lens burying step 4, the ion exchange time is so selected that the buried depth becomes equal to the focal length of the lenses.

The liquid crystal display panel of the present embodiment, fabricated as explained above, improves the efficiency of light utilization, since the illuminating light is efficiently condensed by the microlenses into the pixel apertures as indicated by arrows in FIG. 26, and prevents the photocurrent generation, as the TFT's are shielded by the Ti mask. Also the present embodiment simplifies the manufacturing process since the Ti mask need not be removed.

In the foregoing embodiments the TFT may change into any type, such as of a-Si or p-Si, that can be formed on a glass substrate. Also the ions for microlens formation, mask material and material for ion intercepting layer and the like are not limited to those explained above, but can be properly modified within the scope of the present invention.

In the use of a microlens array, the relationship to be satisfied by the pixel size, focal length of microlenses and the like for achieving the most effective light utilization was explained as above. According to this relationship, if the pixel density is increased for meeting the requirements of high definition television, the microlenses have to positioned closer toward the liquid crystal layer. In such case, it becomes no longer possible to place a thick alkali-free glass substrate, as in the prior art configuration, between the TFT and the alkaline glass substrate including the microlens array. As will be understood from this fact, the present invention is most effectively applied to a liquid crystal display panel combined with a microlens array.

Figure 27:
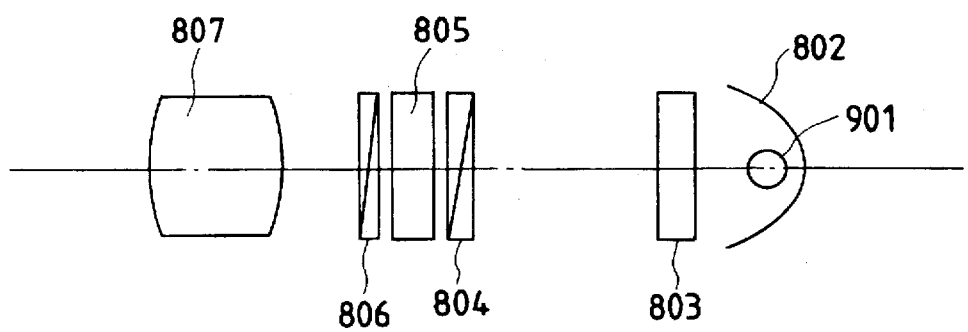
FIG. 27 is a schematic view of a projector constituting an embodiment of the present invention.

FIG. 27 shows an embodiment in which the liquid crystal display panel of the present invention explained as above is applied to a projector, wherein the basic constitution is same as in FIG. 18.

The light beam emitted from a light source 801 such as a metal halide lamp is converted, by a rotary parabolic reflector 802, into a substantially parallel illuminating light beam, which is transmitted through a filter 803 for eliminating unnecessary infrared and ultraviolet lights, and illuminates a liquid crystal display panel 805 positioned a polarizer 804 in the front and a detector 806 at the back. Said panel 805 modulates the illuminating light beam according to display signals, and the obtained light beam containing the information of displayed image is projected onto an unrepresented screen by a projection lens 807.

Furthermore said reflector 802 can be of any configuration providing with a substantially parallel light, such as the combination of a rotary elliptical mirror and a condenser lens.

As explained in the foregoing, the present invention in the third embodiment can prevent ion permeation from the alkali-containing glass substrate to the channel area of TFT, namely the layer between the source and drain electrodes and the gate electrode, particularly a-Si or p-Si layer, thereby to maintain satisfactory performance of TFT. Also the ion exchange intercepting mask, employed in the formation of distributed refractive index microlens array, may also be utilized as a ion intercepting mask for the TFT gate or a light shielding mask for photocurrent prevention, and the fabricating process can be simplified as said ion exchange intercepting mask need not be removed. Furthermore, since the microlenses and the TFT formation can be prepared in monolithic manner, there can be achieved a more accurate precision in the alignment between the microlenses, the light shielding (ion intercepting) mask, the TFT's and the pixel apertures.

What is claimed is:

1. A liquid crystal display panel comprising:
   a liquid crystal layer including a plurality of pixels; and
   a microlens array provided at the light incident side of said liquid crystal layer;
   wherein a distance between said microlens array and said liquid crystal layer at a central portion of said liquid crystal display panel is different from that at a peripheral portion of said liquid crystal display panel.

2. A liquid crystal display panel according to claim 1, wherein the distance between said microlenses and said liquid crystal layer is gradually decreased from the central portion toward the peripheral portion of said liquid crystal display panel.

3. A liquid crystal display panel according to claim 1, wherein the positions of said liquid crystal layer and said microlenses are so determined that the principal ray of the incident to each microlens in said microlens array passes through the substantial center of the aperture of each of the corresponding pixels.

4. A liquid crystal display panel according to claim 1, wherein said plurality of pixels are two-dimensionally arranged and a plurality of microlenses of said microlens array are two-dimensionally arranged.

5. A liquid crystal display panel according to claim 1, wherein said plurality of pixels are one-dimensionally arranged and a plurality of microlenses of said microlens array are one-dimensionally arranged.

6. An information forming apparatus comprising:
   a light source; and
   a liquid crystal display panel for forming an information light beam by modulating light from said light source, wherein said liquid crystal display panel at least includes a liquid crystal layer having a plurality of pixels and a microlens array provided at the light incident side of said liquid crystal layer, wherein a distance between said microlens array and said liquid crystal layer at a central portion of said liquid crystal display panel is different from that at a peripheral portion of said liquid crystal display panel.

7. A projector comprising:
   a light source;
   a liquid crystal display panel for forming an image by modulating a light from said light source, wherein said liquid crystal display panel includes a liquid crystal layer having a plurality of pixels and a microlens array provided at the light incident side of said liquid crystal layer, wherein a distance between said microlens array and said liquid crystal layer at a central portion of said liquid crystal display panel is different from that at a peripheral portion of said liquid crystal display panel.

8. A light modulating device comprising:
   a light modulating layer including a plurality of separate areas; and
   condensing means for condensing each portion of light into a corresponding area of said plural separate areas, wherein a distance between said condensing means and said light modulating layer at a central portion of said light modulating device is different from that at a peripheral portion of said light modulating device.

9. An information forming apparatus comprising:
   a light source; and
   light modulating means for forming an information by modulating light from said light source, wherein said light modulating means includes a light modulating layer having a plurality of separate areas and condensing means for condensing each portion of the light into a corresponding area of said plural separate areas, wherein a distance between said condensing means and said light modulating layer at a central portion of said light modulating means is different from that at a peripheral portion of said light modulating means.

10. A liquid crystal display panel comprising:
    a liquid crystal layer including a plurality of pixels; and
    a microlens array for converging each portion of light onto a corresponding pixel of said plural pixels, wherein rays of the light are divergently emitted from each point on said microlens array, wherein said liquid crystal display panel satisfies the following relationship: $2L \cdot \tan \Theta \leq W$, wherein L is the distance between said liquid crystal layer and said microlens array, W is the width of the pixel of said liquid crystal layer, and $\Theta$ is the angle between a central ray and an outer most ray of said rays of the light.

11. A liquid crystal display panel according to claim 10, wherein said microlens array is formed on a surface of a first substrate at the side of said liquid crystal layer and a second substrate is provided between said liquid crystal layer and said first substrate so as to sandwich said microlens array.

12. A projector comprising:
    a light source;
    a liquid crystal display panel for forming an image by modulating light from said light source; and
    means for projecting said image onto a plane,
    wherein said liquid crystal display panel includes a liquid crystal layer having a plurality of pixels and a microlens array for converging each portion of light onto a corresponding pixel of said plural pixels, wherein rays of the light area divergently emitted from each point on said microlens array, wherein said liquid crystal display panel satisfies the following relationship: $2L \cdot \tan \Theta \leq W$, wherein L is the distance between said liquid crystal layer and said microlens array, W is the width of the pixel of said liquid crystal layer, and $\Theta$ is the angle between a central ray and an outer most ray of said rays of the light.

13. A light modulating device comprising:
    a light modulating layer having a plurality of separate areas; and
    condensing means for condensing each portion of light into corresponding area of said plural separate areas, wherein rays of the light are divergently emitted from each point on said microlens array, wherein said light modulating device satisfies the following relationship: $2L \cdot \tan \Theta \leq W$, wherein L is the distance between said light modulating layer and said microlens array, W is the width of the area of said light modulating layer, and $\Theta$ is the angle between a central ray and an outer most ray of said rays of light.

14. An information forming apparatus comprising:
    a light source; and
    light modulating means for forming an information by modulating light from said light source, wherein said light modulating means includes a light modulating layer having a plurality of separate areas and condensing means for condensing each portion of the light into corresponding area of said plural separate areas, wherein rays of the light are divergently emitted from points on said microlens array, wherein said light modulating means satisfies the following relationship: $2L \cdot \tan \Theta \leq W$, wherein L is the distance between said light modulating layer and said microlens array, W is the width of the area of said light modulating layer, and $\Theta$ is the angle between a central ray and an outer most ray of said rays of the light.

15. A liquid crystal display panel comprising:

a first substrate:

a second substrate containing alkali ions;

a thin film transistor formed on said second substrate;

a liquid crystal layer sandwiched between said first and second substrates; and an ion intercepting layer for preventing intrusion of the alkali ions from said second substrate into said thin film transistor, wherein said ion intercepting layer is formed in an area corresponding to said thin film transistor, on said second substrate; and wherein said second substrate is provided therein, at a distance from said liquid crystal layer, with a plurality of refractive index distribution type microlenses, arranged one- or two-dimensionally, each of which corresponds to a pixel.

16. A liquid crystal display panel according to claim 15, wherein said ion intercepting layer comprises a translucent film of silicon oxide or silicon nitride.

17. A liquid crystal display panel according to claim 15, wherein said ion intercepting layer is so formed as to cover the areas other than optical paths of plural light beams, which are condensed from a substantially parallel light beam by said refractive index distribution type microlenses.

18. A liquid crystal display panel comprising:

a first substrate;

a second substrate containing alkali ions;

a thin film transistor formed on said second substrate;

a liquid crystal layer sandwiched between said first and second substrates; and an ion intercepting layer for preventing intrusion of the alkali ions from said second substrate into said thin film transistor, wherein said ion intercepting layer is formed in an area corresponding to said thin film transistor, on said second substrate, and wherein said ion interception layer comprises an opaque film of titanium.

19. A liquid crystal display panel comprising:

a first substrate;

a second substrate containing alkali ions;

a thin film transistor formed on said second substrate;

a liquid crystal layer sandwiched between said first and second substrates; and an ion intercepting layer for preventing intrusion of the alkali ions from said second substrate into said thin film transistor, wherein said ion intercepting layer is formed in an area corresponding to said thin film transistor, on said second substrate, wherein said second substrate is provided therein, at a distance from said liquid crystal layer, with a plurality of refractive index distribution type microlenses, arranged one- or two-dimensionally, each of which corresponds to a pixel; and wherein an ion exchange mask, employed in the formation of said microlens array of distributed refractive index type, is used for said ion intercepting layer.

20. An information forming apparatus comprising:

a light source; and a liquid crystal display panel for forming an information bearing light by modulating the light from said light source;

wherein said liquid crystal display panel at least includes:

a first substrate;

a second substrate containing alkali ions;

a thin film transistor formed on said second substrate;

a liquid crystal layer sandwiched between said first and second substrates; and an ion intercepting layer for preventing intrusion of the alkali ions from said second substrate into said thin film transistor, wherein said ion intercepting layer is selectively formed in an area corresponding to said thin film transistor, on said second substrate; and wherein said second substrate is provided therein, at a distance from said liquid crystal layer, with a plurality of refractive index distribution type microlenses, arranged one- or two-dimensionally, each of which corresponds to a pixel.

21. A projector comprising:

a light source;

a liquid crystal display panel for forming an image bearing light by modulating the light from said light source; and projection means for projecting said image bearing light;

wherein said liquid crystal display panel at least includes:

a first substrate;

a second substrate containing alkali ions;

a thin film transistor formed on said second substrate;

a liquid crystal layer sandwiched between said first and second substrates; and an ion intercepting layer for preventing intrusion of the alkali ions from said second substrate into said thin film transistor;

wherein said ion intercepting layer is selectively formed in an area corresponding to said thin film transistor, on said second substrate; and wherein said second substrate is provided therein, at a distance from said liquid crystal layer, with a plurality of refractive index distribution type microlenses, arranged one- or two-dimensionally, each of which corresponds to a pixel.

22. A method for fabricating a liquid crystal display panel, comprising the steps of:

forming, on a first substrate, an ion exchange mask pattern, provided with light intercepting power;

forming, in said first substrate, a microlens array of distributed refractive index type by an ion exchange method;

forming a thin film transistor and wirings for actuating said thin film transistor on said first substrate or on a second substrate; and aligning said first and second substrates in such a manner that said ion exchanging mask is positioned directly above said thin film transistor, thereby formed as a cell.

* * * * *

UNITED STATES PATENT AND TRADEMARK OFFICE
CERTIFICATE OF CORRECTION

PATENT NO. : 5,764,318
DATED : June 9, 1998
INVENTOR(S) : Katsumi Kurematsu, et al.

It is certified that error appears in the above-identified patent and that said Letters Patent is hereby corrected as shown below:

Col. 1, line 4, change "08/341.466," to --08/341,466,--.

Col. 5, line 38, change "alaterally" to --a laterally--.

Col. 6, line 55, change "An" to --$\Delta$n--.

Col. 9, line 65, change "indispensable.." to --indispensable.--

Signed and Sealed this

Seventeenth Day of November, 1998

Attest:

BRUCE LEHMAN

Attesting Officer   *Commissioner of Patents and Trademarks*